(12) United States Patent
Martiel et al.

(10) Patent No.: US 11,010,527 B2
(45) Date of Patent: May 18, 2021

(54) OPTIMIZATION OF A QUANTUM CIRCUIT BY INSERTING SWAP GATES

(71) Applicant: BULL SAS, Les Clayes Sous Bois (FR)

(72) Inventors: Simon Martiel, Montrouge (FR); Elise Rubat Ciagnus, Rouen (FR)

(73) Assignee: BULL SAS, Les Clayes-Sous-Bois (FR)

( * ) Notice: Subject to any disclaimer, the term of this patent is extended or adjusted under 35 U.S.C. 154(b) by 0 days.

(21) Appl. No.: 16/756,145

(22) PCT Filed: Oct. 12, 2018

(86) PCT No.: PCT/FR2018/052543
§ 371 (c)(1),
(2) Date: Apr. 15, 2020

(87) PCT Pub. No.: WO2019/077240
PCT Pub. Date: Apr. 25, 2019

(65) Prior Publication Data
US 2020/0242295 A1    Jul. 30, 2020

(30) Foreign Application Priority Data
Oct. 16, 2017   (FR) ...................................... 1759684

(51) Int. Cl.
*G06F 30/392* (2020.01)
*G06N 10/00* (2019.01)
(Continued)

(52) U.S. Cl.
CPC .......... *G06F 30/392* (2020.01); *G06F 30/394* (2020.01); *G06F 30/398* (2020.01); *G06N 10/00* (2019.01); *G06F 2119/12* (2020.01)

(58) Field of Classification Search
USPC ......................................................... 716/119
See application file for complete search history.

(56) References Cited

U.S. PATENT DOCUMENTS

| | | | |
|---|---|---|---|
| 6,995,404 B2* | 2/2006 | Franson | B82Y 10/00 257/98 |
| 2003/0164490 A1* | 9/2003 | Blais | G06N 10/00 257/14 |

(Continued)

OTHER PUBLICATIONS

International Search Report, dated Feb. 4, 2019, from corresponding PCT application No. PCT/FR2018/052543.

(Continued)

*Primary Examiner* — Mohammed Alam
(74) *Attorney, Agent, or Firm* — Meagher Emanuel Laks Goldberg & Liao, LLP

(57) ABSTRACT

Disclosed is a method for optimizing a quantum circuit of an ordered series of quantum gates, applied to an initial layout of qubit values, consisting in inserting a set of local SWAP gates so that all gates of the circuit are local, the method including: for each gate, if it is not local, inserting a set of local SWAP gates; determining the set of permutations, each consisting of a succession of swaps of qubit values along shortest paths between positions of qubits associated with the gate; and choosing, from the permutations, a permutation that minimizes a cost representing the number of swaps necessary to make the gates of a sequence within the series, of substantially smaller size, local; re-establishing the initial layout by establishing a tree covering a graph representative of the layout of the qubits of the circuit, and by swapping qubit values along paths of the tree.

20 Claims, 4 Drawing Sheets

(51) Int. Cl.
  *G06F 30/398* (2020.01)
  *G06F 30/394* (2020.01)
  *G06F 119/12* (2020.01)

(56) References Cited

U.S. PATENT DOCUMENTS

2006/0123363 A1* 6/2006 Williams ............... G06N 10/00 716/101
2020/0242295 A1* 7/2020 Martiel ................. G06F 30/394

OTHER PUBLICATIONS

Hirata et al.; An Efficient Conversion of Quantum Circuits to a Linear Nearest Neighbor Architecture; Quantum Information and Computation; Jan. 1, 2011; pp. 142-166; vol. 11, No. 1 & 2.

Yamanaka et al.; Swapping labeled tokens on graphs; Theoretical Computer Science; Jan. 1, 2015; pp. 81-94; vol. 586.

Alfailakawi et al.; Harmony-search algorithm for 2D nearest neighbor quantum circuits realization; Expert Systems With Applications; May 14, 2016; pp. 16-27; vol. 61; Oxford, GB.

Bonnet et al.; Complexity of Token Swapping and its Variants; Algorithmica; Sep. 27, 2017; pp. 2656-2682; vol. 80, No. 9.

Pedram et al.; Layout Optimization for Quantum Circuits with Linear Nearest Neighbor Architectures; IEEE Circuits and Systems Magazine; May 24, 2016; pp. 62-74; vol. 16, No. 2.

Bhattacharjee, D. and Chattopadhyay, A., "Depth-optimal Quantum Circut Placement for Arbitrary Topologies, " Nanyang Technological University, 2017.

Kruska, J., "On the shortest spanning subtree of a graph and the traveling salesman problem" Proceedings of the American Mathematical Society, 7: 48-50, JSTOR 2033241 (1956).

Shor, P., "Algorithm for quantum computation: discrete logarithms and factoring" Foundations of Computer Science, pp. 124-134, 1994.

Wille, R. et al., "Optimal Swap Gate Insertion for Nearest Neighbor Quantum Circuits" 2014 19th Asia and South Pacific Design Automation Conference (ASP-DAC).

* cited by examiner

OPTIMIZATION OF A QUANTUM CIRCUIT BY INSERTING SWAP GATES

FIELD OF THE INVENTION

The present invention relates to the field of quantum computers. More specifically, it concerns optimization of a quantum circuit so that all of its component gates are local.

CONTEXT OF THE INVENTION

A quantum circuit uses the quantum properties of matter, such as the superposition of states and entanglement, in order to perform operations on data. Unlike a conventional computer that manipulates binary data, or "bits", a quantum circuit works with qubits, or quantum bits, which represent a quantum state based on two basis states: 0> and 1>.

The first quantum computer algorithms appeared in the 1990s. A particularly iconic algorithm and the origin of a certain craze for quantum computers is Shor's algorithm for polynomial computation, described in P. W. Shor's "*Algorithm for quantum computation: discrete logarithms and factoring*", in Foundations of Computer Science, pages 124-134, 1994.

In general, a quantum circuit can be considered as a succession of quantum operators, or gates, applied to a set of qubits. FIG. 1 illustrates a simple quantum circuit, comprising four qubits q1, q2, q3, q4 arranged in lines. As is conventional, the qubits are represented as horizontal lines. The direction from left to right corresponds to time. In this figure, the circuit is composed of three quantum gates G1, G2, G3, and therefore G1 then G2 then G3 are successively applied over time.

A quantum gate may involve one or a plurality of qubits. They may be of different types and each represents a cost linked to the signal propagation time or the gate transit time. Among the gates conventionally used, we can cite the "swap" gate G1 which swaps two qubit values.

The layout of a quantum circuit implementing an algorithm often results from more or less automatic generation processes. The quantum circuit is therefore described independently of the physical infrastructure on which it is to be deployed.

In particular, these "theoretical" quantum circuits assume that all of the qubits can interact with each other. Thus, in the example of FIG. 1, quantum gate G2 causes qubits q1 and q4 to interact, although these are not neighbors but are separated by qubits q2 and q3.

However, the development of physical infrastructures for quantum computers has revealed some physical constraints. Among these constraints, one referred to as the "locality" constraint means that most infrastructures only allow interactions between nearby qubits. This locality constraint is imposed by the physical mechanisms used to implement qubits and quantum gates. Therefore, a quantum gate such as gate G2 in FIG. 1 cannot be deployed directly in this type of architecture.

Some classical algorithms, such as Shor's algorithm, can be optimized to allow them to be implemented on architectures subject to the locality constraint. But in general, as stated above, the layouts of quantum circuits are synthesized, possibly automatically, without taking this constraint into account. There therefore appears to be a need for methods and tools for optimizing such a circuit, in other words for converting a circuit that is independent of the physical infrastructure into a functionally equivalent circuit that satisfies the locality constraint.

Several methods have been proposed, which in general rely on the insertion of local "SWAP" gates. By inserting swap gates upstream of a given quantum gate, qubits can be swapped so that the quantum gate becomes local.

FIGS. 2*a*, 2*b*, 2*c* illustrate this issue. FIG. 2*a* represents an unoptimized quantum circuit for a network of four qubits q1, q2, q3, q4 arranged in lines. One will note several non-local quantum gates, in other words gates requiring non-adjacent qubits to interact. Quantum gates are represented by vertical segments that connect the lines of the qubits on which they act. The graphical representations of these connections (dots, circles . . . ) correspond to the type of quantum gate and the type of action on these qubits.

FIGS. 2*b*, 2*c* show two possible optimizations of this circuit by insertions of quantum swap gates so that each of the gates becomes local. Swap gates are represented with terminal x-marks.

However, each Swap quantum gate insertion represents a cost, tied in particular to the time required to traverse the gate. It is therefore important to determine which of the optimized equivalent circuits minimizes this additional cost.

Finding an optimal solution to this problem is not possible because, with the number of qubits and gates, there is an exponential number of functionally equivalent circuits satisfying the locality constraint.

Different solutions to this problem have been proposed. For example, we can cite the master's thesis "An efficient method to convert arbitrary quantum circuits to ones on a Linear Nearest Neighbor architecture" by Yuichi Hirata, defended at the Institute of Science and Technology of Nara, Japan. We can also cite the article "Depth-optimal Quantum Circuit Placement for Arbitrary Topologies" by Bhattacharjee Debyoti and Chattopadhyay Anupam, of the Nanyang Technological University, 2017. We can also cite the article "Optimal SWAP Gate Insertion for Nearest Neighbor Quantum Circuits" by Robert Wille, Aaron Lye and Rolf Drechsler, in the 2014 19th Asia and South Pacific Design Automation Conference (ASP-DAC).

However, these solutions are very slow to find a solution because they search for the globally optimal solution. When the number of qubits and gates becomes large, the determination of the quantum circuit representing a global optimum is no longer possible in the framework of a complex algorithm, and these prior art solutions become unusable in actual practice.

Other families of solutions aim to solve the problem within a more managed framework of a given physical infrastructure, in order to limit the combinatorics.

The invention aims to propose a solution which can apply to various physical infrastructures as well as achieve performance levels enabling its effective use for large numbers of qubits and quantum gates.

SUMMARY OF THE INVENTION

The object of the present invention is to provide a solution which at least partially overcomes the aforementioned disadvantages.

To this end, the present invention proposes a method for optimizing a quantum circuit composed of an ordered series of quantum gates applied to an initial layout of qubit values, consisting of inserting a set of local SWAP gates so that all the gates of said quantum circuit are local, comprising steps consisting of:
  inserting, for each quantum gate of said series if the gate is not local, a set of local SWAP gates before said quantum gate, determining the set of permutations, each consisting of a succession of swaps of qubit values along the shortest paths between the positions of qubits associated with said quantum gate, and choosing, from said set of permutations, a permutation minimizing a cost representing the number of swaps required to make local the quantum gates of a sequence within said series, the size of said sequence being substantially smaller than that of said series;

restoring said initial layout by establishing a spanning tree of a graph representative of the layout of the qubits of said circuit, and by performing swaps of qubit values along paths of said tree.

According to preferred embodiments, the invention comprises one or more of the following features which may be used alone or in combination with some or all of the others:

the determination of the set of permutations is carried out by determining a succession of swaps of qubit values along first shortest paths between any pair of positions of qubits associated with said quantum gate, then, if said quantum gate has more than two positions of qubits so associated, by determining a succession of swaps of qubit values along second shortest paths between each of the positions, aside from those already considered, and the first shortest paths already determined;

said cost takes into account a cost attached to each type of SWAP gate to be inserted;

the initial layout is restored using a token swapping algorithm;

said token swapping algorithm is the one described in paragraph 3.2 of the article "Swapping Labeled Tokens on Graph" by K. Yamanaka, E. D. Demaine, T. Ito, J. Kawahara, M. Kiyomi, Y. Okamoto, T Saitô, A. Suzuki, K. Uchizawa and T. Uno;

the size of said sequence is between 3 and 5;

said shortest paths are determined by precalculating the shortest paths between all the vertices of said graph;

said shortest paths are calculated by Dijsktra's algorithm.

Another object of the invention relates to a computer program comprising instructions which, when executed by a processor of a computer system, result in implementing a method as defined above.

Another object of the invention is a platform for optimizing a quantum circuit composed of an ordered series of quantum gates applied to an initial layout of qubit values, consisting of inserting a set of local SWAP gates so that all the gates of said quantum circuit are local, comprising digital processing means for inserting, for each quantum gate of said series if the gate is not local, a set of local SWAP gates before said quantum gate, determining the set of permutations, each consisting of a succession of swaps of qubit values along the shortest paths between the positions of qubits associated with said quantum gate, and choosing, from said set of permutations, a permutation minimizing a cost representing the number of swaps required to make local the quantum gates of a sequence within said series, the size of said sequence being substantially smaller than that of said series;

restoring said initial layout by establishing a spanning tree of a graph representative of the layout of qubits of said circuit, and by swapping qubit values along paths of said tree.

Other features and advantages of the invention will be apparent from reading the following description of a preferred embodiment of the invention, given as an example and with reference to the accompanying drawings.

BRIEF DESCRIPTION OF DRAWINGS

FIGS. 7a to 7d schematically illustrate steps in the swapping of qubits in an example graph, in order to transition from one layout to another.

DETAILED DESCRIPTION OF THE INVENTION

The invention therefore aims to optimize a quantum circuit consisting of a set of qubits and a set of quantum gates, in order to make the gates local. Obviously, the quantum circuit resulting from this optimization must be functionally equivalent, in other words must provide identical output for a given input.

Such an optimized quantum circuit can then be implemented on any physical infrastructure, in particular an infrastructure imposing a locality constraint for the quantum gates.

Recall that what is referred to as "local" is the fact that interactions are between qubits that are adjacent in the underlying topological layout. A gate is therefore said to be "local" if the qubits that will interact as input are adjacent. This concept is now well-known to those skilled in the art, and more or less formalized definitions can be found in the literature.

Figure 3:
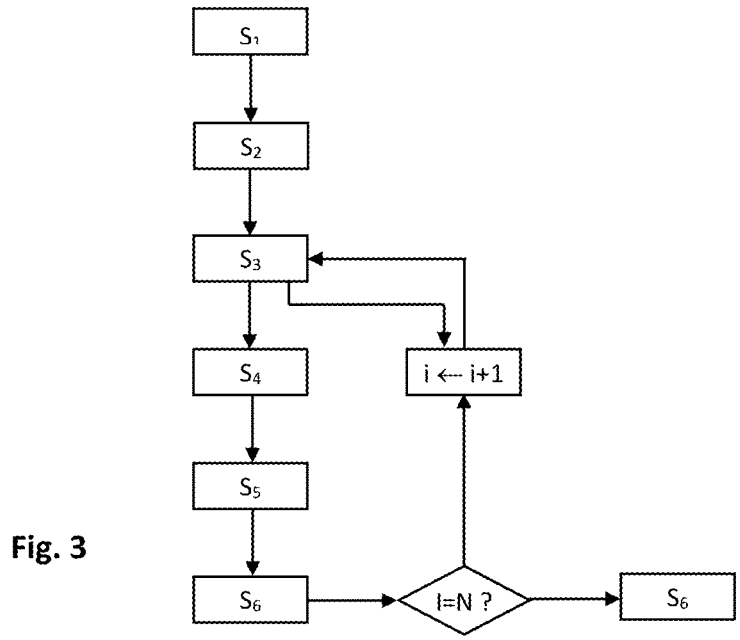
FIG. 3 represents a flowchart according to one embodiment of the invention.

FIG. 3 represents a flowchart describing one possible implementation of the method according to the invention.

As input to this algorithm, we have a data structure describing a qubit layout. This structure can be a simple vector in the case of a linear layout, but it can be more complex for other types of layouts.

The first step S1 is a preliminary step consisting of determining a graph representative of the layout of the qubits of the quantum circuit to be optimized. The vertices of the graph represent the positions of the qubits and the edges represent the neighbor relationships between the qubit positions.

We distinguish here between qubit positions and qubit values. The location of a qubit within the physical infrastructure is called its position. After a SWAP gate, for example, the values of two qubit positions are exchanged. In FIGS. 1, 2a, 2b, 2c, the qubit positions represent the horizontal lines, these being able to move between lines and be modified due to the quantum gates.

The graph determined at the end of this step S1 is invariant in its topology throughout the optimization process which will be described. However, these nodes, which correspond to qubit positions, carry the value of the qubits which will evolve as swaps are applied.

Figure 1:
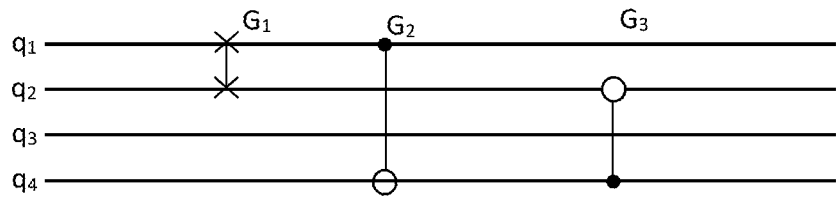
FIG. 1 schematically represents an example of a simple quantum circuit according to the prior art.
Figure 2A:
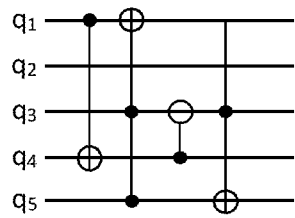
FIGS. 2a, 2b, 2c schematically represent an example of a quantum circuit and two possible optimizations by inserting Swap gates, according to the prior art.
Figure 2B:
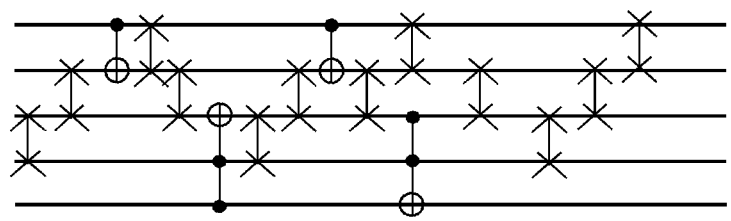
Figure 2C:
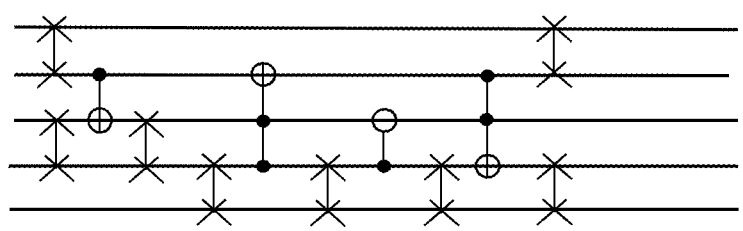
Figure 4A:
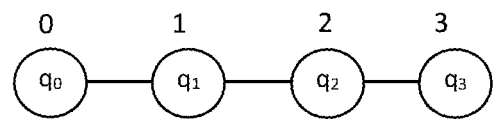
FIGS. 4a and 4b schematically represent an example of a graph concerning the layout of the qubits, according to one embodiment of the invention.
Figure 4B:
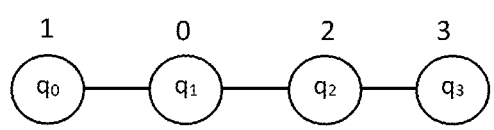

FIG. 4a represents a graph of a simple linear layout of four positions q0, q1, q2, q3 respectively having the values 0, 1, 2, 3, 4. After application of a swap gate between positions q0 and q1, the graph becomes as shown in FIG. 4b.

Figure 5A:
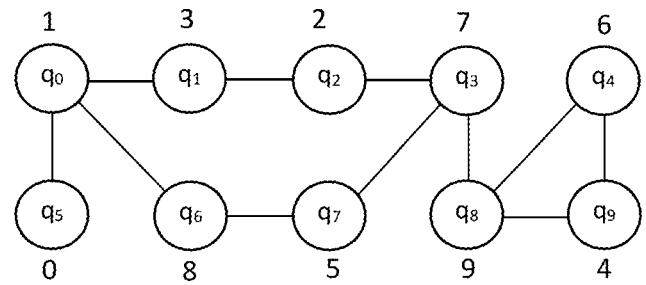
FIGS. 5a to 5d also represent a graph concerning the layout of the qubits, and various steps for transitioning from one layout to another.

FIG. 5a represents a graph of a more complex topological layout of 10 positions q0, q1, q2, q3, q4, q5, q6, q7, q8, q9. The edges indicate adjacencies and the labels next to each position indicate the respective values.

Step S2 is another preprocessing step consisting of calculating the shortest path between each pair of vertices of the graph.

These shorter paths will be used in the rest of the method. As this method is iterative, it is useful to pre-calculate these shorter paths prior to the iterative loop S3-S6, rather than to calculate them during several iterations of the loop.

The shortest path between two vertices can be calculated according to several embodiments. One possible algorithm is Dijsktra's algorithm. This algorithm is one of the algorithms well known to those skilled in the art. It is for example described in any general algorithmic manual, and on the Wikipedia page:

https://fr.wikipedia.org/wiki/Algorithme_de_Dijkstra

This precalculation has quadratic complexity in the number of qubits, but then allows estimating the "localization" cost of a quantum gate in constant time, in other words the number and cost of the Swap gates to be inserted in order to make a gate local. We can thus obtain the gates to be inserted in linear time concerning the number of qubits.

The loop S3-S6 is iterated for each of the quantum gates i of the circuit which we wish to make local.

In a step S3, it is checked whether or not the quantum gate i is local. If it is already local (which is obviously the case for gates involving a single qubit), then the next quantum gate is considered, by incrementing the counter i.

In a step S4, a set is created of possible permutations which enable making the quantum gate i local. Permutation is what we call a bijection of the set of qubits into itself.

Each permutation can be viewed as the result obtained by a series of swaps of the qubit values of two adjacent positions (in other words a series of Swap gates).

According to one implementation of the invention, it does not search for all possible permutations, but instead it uses a heuristic to determine a subset. The chosen heuristic makes it possible to guarantee that this subset is relevant and is ultimately able to determine a satisfactory solution for optimizing the circuit as a whole.

To do this, it is proposed to consider the shortest paths between the qubits concerned by the quantum gate. If the quantum gate is a gate involving two qubits, only these two are considered; if the quantum gate is a gate involving more qubits, any pair of qubits among them is considered.

For a pair of qubits concerned by said quantum gate, the set of possible permutations is created, each obtained by a succession of swaps of qubits located on the shortest path between the qubits of the pair and resulting in making local a quantum gate i.

In the example of FIG. 5a, a quantum gate i is considered that involves the positions of qubits q1, q6, q8. The pair q1, q8 is selected arbitrarily (this selection can be random).

The shortest path in the graph between these two qubit positions is then determined. This shortest path is [q1, q2, q3, q8].

The set of successive swaps between two adjacent qubits located on this path which result in the qubits initially located at positions q1 and q8 being adjacent is then created.

Three permutations are thus determined, each of which can be obtained by two swaps of qubits:

[1, 3, 9, 2, 6, 0, 8, 5, 7, 4], resulting from swaps (q8, q3) and (q3, q2);

[1, 2, 3, 9, 6, 0, 8, 5, 7, 4], resulting from swaps (q8, q3) and (q1, q2);

[1, 2, 7, 3, 6, 0, 8, 5, 9, 4], resulting from swaps (q1, q2) and (q2, q3).

Figure 5B:
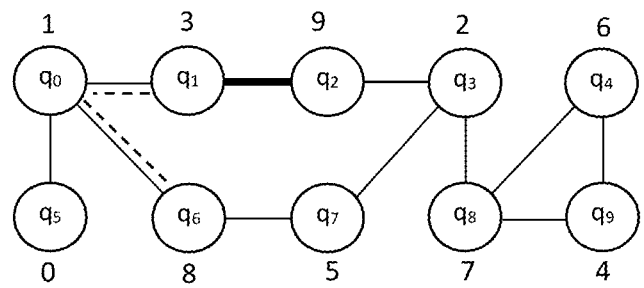
Figure 5C:
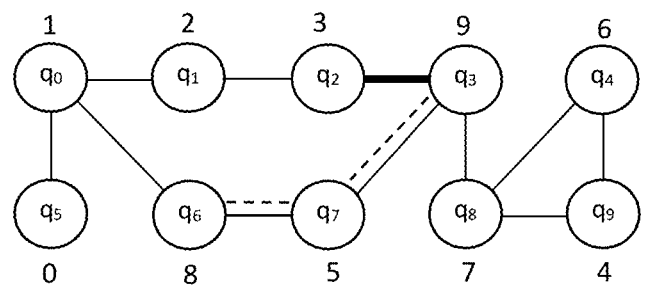
Figure 5D:
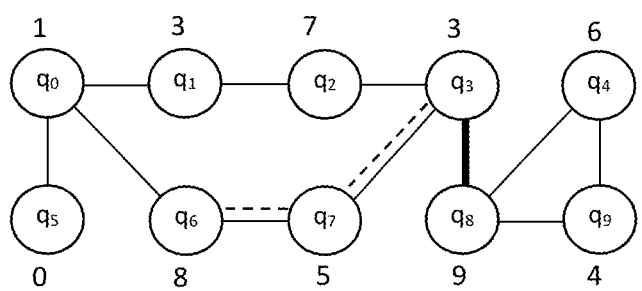

FIGS. 5b, 5c, and 5d schematically represent graphs of topological layouts, respectively corresponding to these three permutations applied to the example of FIG. 5a as the initial state.

One can see that the values 3 and 9, initially located at positions q1 and q8 respectively, are now adjacent in these three permutations.

If quantum gate i concerned only these two qubits, the work would stop there: as the values 3 and 9 are adjacent, they can interact locally.

As quantum gate i in the example concerns a third qubit of value 8 in position q6, the process continues by considering the shortest path between this position q6 and the pair of positions where the values 3 and 9 are located, in other words q1, q2 in FIG. 5b, q2, q3 in FIGS. 5c, and q3, q8 in FIG. 5c. The pair of positions where qubit values 3 and 9 are located are indicated with a thicker line. The shortest paths are represented by a dotted line.

In the same manner as above, for each of the previously obtained permutations, the set of the series of swaps between two adjacent qubits located on this path which make adjacent the qubits initially located at positions q6 and q1 or q2, or q2 or q3, or indeed q3 or q8, respectively, are then created. These additional series can be added to the successions of swaps previously obtained.

In this example, the shortest path to the third qubit is of length 2: a single swap is therefore necessary in this shortest path. Consequently, the number of possible successions of swaps making it possible to obtain the 3 permutations remains 3:

[8, 3, 9, 2, 6, 0, 1, 5, 7, 4], resulting from swaps (q8, q3), (q3, q2) and (q6, q0);

[1, 2, 3, 9, 6, 0, 5, 8, 7, 4], resulting from swaps (q8, q3), (q1, q2) and (q6, q7);

[1, 2, 7, 3, 6, 0, 5, 8, 9, 4], resulting from swaps (q1, q2), (q2, q3) and (q6, q7).

Each swap thus applied corresponds to the insertion of a Swap type of quantum gate.

It should be noted that this manner of proceeding is not optimal in the case of a quantum gate with three qubits. However, in practice, most gates are one or two qubits, so the non-optimal contribution of a 3-qubit gate has little impact on the optimization of an entire quantum circuit.

For each permutation, an associated cost can be calculated. This cost corresponds to the number of Swap quantum gates inserted (therefore to the number of swaps), possibly weighted by a cost per edge of the graph. It may indeed be more or less expensive to swap qubits in certain positions, due to the underlying physical infrastructure.

This cost C can then be expressed:

$$C = \sum_l p_{i,j} \cdot S_{j,l},$$

where $S_{i,j}$ represents the number of Swap gates inserted between positions i and j, and $p_{i,j}$ the weight of edge i,j of the graph, in other words a cost associated with swapping qubits between positions i and j.

In a step S5, a choice is made among the permutations determined in the previous step S3, as a function of a cost. This cost may be the cost C calculated above which we seek to minimize Preferably, however, the cost used for the choice is a cumulative cost combining the costs determined for the various swaps for a certain number w of subsequent quantum gates in the ordered series constituting the quantum circuit.

In other words, this step S5 involves choosing the permutation that minimizes this cost representing the number of necessary swaps (and possibly their weights $p_{i,j}$) in order to make local the quantum gates of a sequence of length w within the series of gates constituting the quantum circuit.

Figure 6:
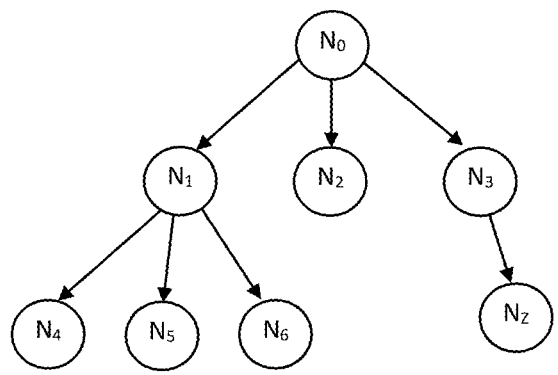
FIG. 6 schematically represents a tree structure for selecting a permutation, according to one embodiment of the invention.

FIG. 6 schematically represents such a tree structure. Node $N_0$ represents the initial position of FIG. 5a. Nodes $N_1$, $N_2$, $N_3$ represent the three permutations respectively corresponding to FIGS. 5b, 5c, 5d and to gate i. In order to choose between these three permutations, permutations $N_4$, $N_5$, $N_6 \ldots N_Z$ are determined for gates i+1 and i+2 (where w=2), and the costs associated with each permutation are calculated. These costs are added together along each path leading from one of permutations $N_1$, $N_2$, $N_3$ to a leaf. Ultimately, the node associated with the lowest cost can be chosen.

Note that this is a heuristic based on local optimization, in which the number of gates w is a parameter.

It defines a depth of a computation tree, and its determination sets a compromise between a global search over the entire circuit which would lead to a combinatorial explosion, and a highly local search (w=1, w=2 . . . ) which would lead to a satisfactory but non-optimal final solution.

The choice of parameter w can be made experimentally, for example by conducting a battery of tests on a varied set of quantum circuits. This set of circuits may in particular be obtained randomly.

Experimentally, it has been found that w=4 is a good compromise between quality of the approximation and computation time.

In a step S6, once this choice has been made, it is possible to update data structures, stored in memory, which will provide the solution at the end of the last iteration of the loop S3-S5.

In particular, the following may be updated:

The number of Swap gates to insert: nbtotal(i)=nbtotal(i−1)+nb(i). This simply involves adding the number of qubit swaps in the permutation chosen for the current quantum gate i, to a total number calculated for the previous gate i−1.

The list of Swap gates to insert: listtotal(i)=listtotal(i−1)+list(i). This involves the insertion of the swaps just determined for the current gate i into the set of swaps already determined up to the previous gate i−1.

Finally, the data structure representing the layout of the circuit is updated by taking the value of the chosen permutation as the new value.

For example, if the permutation corresponding to node $N_2$ is chosen, these structures of values will have as their value, at the end of the iteration corresponding to this gate i:

Nb(i)=3

List(i)={(q8, q3), (q1, q2) and (q6, q7)} and as the layout: [1, 2, 3, 9, 6, 0, 5, 8, 7, 4].

The method can then loop back to step S3, in a next iteration consisting of considering quantum gate i+1. The quantum gates of the ordered series forming the quantum circuit are thus processed successively. When the last quantum gate of the circuit is reached (i=N), the method continues with a step S7 consisting of restoring the initial layout of the qubits.

This step S7 therefore aims to determine a set of insertions of Swap-type quantum gates which, from the permutation obtained for the last iteration of loop S3-S5 (meaning for i=N), restores the initial layout. It also attempts to minimize the cost associated with these insertions.

This technical problem can be solved in different ways, can be boiled down to a general token swapping problem which was described in the article "Swapping Labeled Tokens on Graph" by K. Yamanaka, E. D. Demaine, T. Ito, J. Kawahara, M. Kiyomi, Y. Okamoto, T. Saito, A. Suzuki, K. Uchizawa and T. Uno, in *Fun with Algorithms* (2014): 364-375.

It has been shown that at least one solution exists, regardless of the initial and final states, which consists of a succession of token swaps (or swaps of adjacent qubits in the equivalent case that is of interest to us).

On the other hand, since this token swapping problem is NP-complete, it turns out that is impossible in practice to determine the optimal solution, in other words one which gives a minimum number of swaps. The article mentioned above therefore proposes a heuristic method for determining an approximate solution.

FIGS. 7a, 7b, 7c, 7d are taken from the article mentioned above and illustrate a series of token swaps (or qubit swaps) between one layout $f_0$ and another layout $f_t$ within a graph comprising 6 nodes (or qubit positions) $v_0$, $v_1$, $v_2$, $v_3$, $v_4$, $v_5$, $v_6$, on which 6 tokens (or qubits) are placed.

FIG. 7a represents an initial layout $f_0$ which can correspond to the last permutation of qubits obtained in step S5 for the last quantum gate i=N. FIG. 7d represents a final layout $f_t$ which corresponds to the initial layout of the qubits, for example as available in steps S1, S2.

Figure 7B:
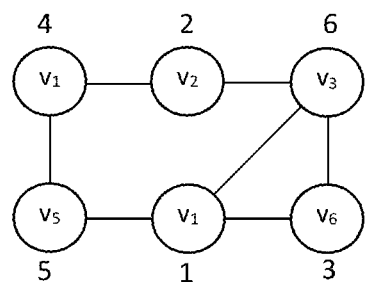
Figure 7B:
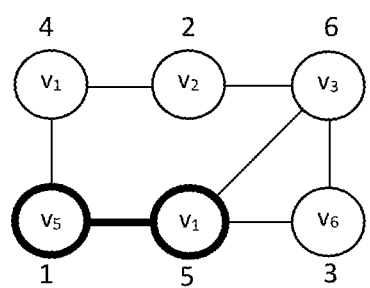
Figure 7C:
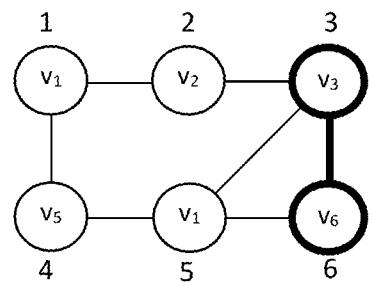
Figure 7C:
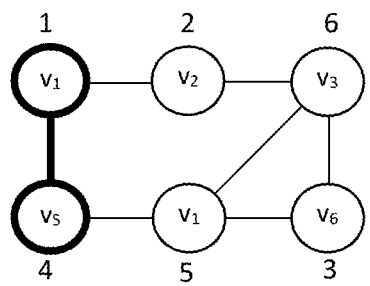

FIGS. 7b, 7c show two intermediate steps in the shortest path among the successions of token swaps leading from $f_0$ to $f_t$: a first swap between tokens 5 and 1 (initially in positions $v_4$ and $v_5$ respectively) yields the layout illustrated in FIG. 7b; a second swap between tokens 4 and 1 (respectively in positions $v_1$ and $v_4$) yields the layout illustrated in FIG. 7c; then the last swap between tokens 16 and 3 (respectively in positions $v_3$ and $v_6$) yields the final layout $f_t$.

The abovementioned article "Swapping Labeled Tokens on Graph" describes several methods for solving this type of technical problem in the case of token swaps.

In the context of qubit swaps, we first create a spanning (or "covering") tree of the graph representative of the layout of qubits.

A "spanning tree" is a tree included in this graph and which connects all vertices of the graph.

Among the different spanning trees, we select the one for which the sum of the weights of the edges is the lowest. If the qubit swaps, meaning the Swap quantum gates, all have the same weight (or cost), then this problem reduces to a simple depth-first search of the graph.

Otherwise, existing algorithms for determining spanning trees can be used. Among these algorithms, we can notably cite Kruskal's algorithm. A presentation of this algorithm can be found on the website of the collaborative encyclopedia Wikipedia:

https://fr.wikipedia.org/wiki/Alforithme_de_Kruskal in French and https://en.wikipedia.org/wiki/Krushal%27s_algorithum in English.

The algorithm was presented for the first time in the article by Kruskal, J. B., "On the shortest spanning subtree of a graph and the traveling salesman problem" in Proceedings of the American Mathematical Society, 7: 48-50, JSTOR 2033241 (1956).

Based on this spanning tree, the algorithm described in paragraph 3.2 of the abovementioned article can be used.

A graph $D=(V_D, E_D)$ satisfying characteristics (1) and (2) below is called the conflict graph of a layout f:

(1) $V_D=\{v_i \in V(G); f(v_i) \neq f_i(v_i)\}$ (2) an arc $(v_i, v_j)$ exists in the graph D if and only if $f(v_i)=f(v_j)$ where:

$V_D$ is the set of nodes, in other words the positions of the qubits, for the conflict graph D, and V is the set of nodes for graph G representative of the layout of the qubits.

$E_D$ and E are respectively the sets of edges for the conflict graph D and the graph G.

$f(v_i)$ is the value of the qubit in position $v_i$ in layout f.

Thus, in FIGS. 7a and 7d, one will note in particular that $f(v_1)=4$ and $f_t(v_4)=4$, that $f(v_5)=$ and $f_t(v_1)=1$; and that $f(v_4)=5$ and $f_t(v_5)=5$. We obtain in a subgraph of the conflict graph D linking $v_1$, $v_4$ and $v_5$.

In other words, each qubit value $f(v_i)$ located at position $v_i$ in layout f, in conflict graph D, must be moved to position $v_j$ in that same conflict graph, such that $(v_i, v_j) \in E_D$.

The previously determined spanning tree T will now be considered.

For two nodes u and v of this tree T, P(u, v) denotes a unique path of the tree between these nodes u and v.

The conflict graph D is considered for an initial layout $f_0$ of qubits of the tree T. Also considered is $C=(w_1, w_2, w_3 \ldots w_q)$ for an arbitrary directed cycle of the conflict graph D where $w_q=w_1$.

If we posit $\ell_k=f_0(w_k)$ for all k such that $1 \leq k \leq q-1$, then $f_t(w_{k+1})=\ell_k$.

The proposed iterative algorithm then aims to move qubits $\ell_1, \ell_2, \ell_3 \ldots \ell_{q-1}$ of cycle C to their target positions along unique paths. More specifically, a subsequence of swaps $S_C$ is constructed as follows:

we initialize $f_{1,0}=f_0$ in step k, where $1 \leq k \leq q-2$, we consider the qubit value $\ell_k=f_0(w_k)$ whose current position is $f_{k,0}^{-1}(\ell_k)$, and it is moved to the position in path $P(f_{k,0}^{-1}(\ell_k), f_{k,0}^{-1}(\ell_{k+1}))$ which is adjacent to position $f_{k,0}^{-1}(\ell_{k+1})$.

$f_{k+1,0}$ denotes the layout of the tree T which results from this movement.

In step (q-1), the qubit value $\ell_{q-1}=f_0(w_{q-1})$ is moved from its current position $f_{q-1,0}^{-1}(\ell_{q-1})$ to position $w_q$ (=$w_1$).

At the end of the algorithm, this sequence $S_C$ possesses two characteristics:

(a) $\text{Len}(S_C) \leq \in_{1 \leq k \leq q-1} sP_T(w_k, w_{k+1})$ where $\text{Len}(S_C)$ is the length of sequence $S_C$ and $sP_T(w_k, w_{k+1})$ is the number of edges in the tree T between positions $w_k$ and $w_{k+1}$;

(b) The layout f of the tree T obtained by sequence $S_C$ satisfies, for each position $v_i$ of V(T):

$$f(v_i) = \begin{cases} f_t(v_i) & \text{if } v_i \in C \\ f_0(v_i) & \text{if not} \end{cases}$$

These features allow us to choose the directed cycles of the conflict graph D in an arbitrary order. And so, by iteratively constructing swap sequences for all directed cycles of D, layout $f_t$ of the tree T is finally reached.

In other words, we manage to reconstruct the initial layout of the qubits, iteratively and in polynomial time.

Of course, the present invention is not limited to the examples and embodiments described and shown, but it is capable of numerous variants accessible to those skilled in the art.

The invention claimed is:

1. Method for optimizing a quantum circuit composed of an ordered series of quantum gates applied to an initial layout of qubit values, consisting of inserting a set of local SWAP gates so that all the gates of said quantum circuit are local, comprising steps consisting of:

inserting, for each quantum gate of said series if the gate is not local, a set of local SWAP gates before said quantum gate, determining (S4) the set of permutations, each consisting of a succession of swaps of qubit values along the shortest paths between the positions of qubits associated with said quantum gate, and choosing (S5), from said set of permutations, a permutation minimizing a cost representing the number of swaps required to make local the quantum gates of a sequence within said series, the size of said sequence being substantially less than that of said series;

restoring (S7) said initial layout by establishing a spanning tree of a graph representative of the layout of the qubits of said circuit, and by performing swaps of qubit values along paths of said tree.

2. The method according to claim 1, without which the determination (S4) of the set of permutations is carried out by determining a succession of swaps of qubit values along first shortest paths between any pair of positions of qubits associated with said quantum gate, then, and if said quantum gate has more than two positions of qubits so associated, determining a succession of swaps of qubit values along second shortest paths between each of the positions, aside from those already considered, and the first shortest paths already determined.

3. The method according to claim 1, wherein said cost takes into account a cost attached to each type of SWAP gate to be inserted.

4. The method according to claim 1, wherein the initial layout is restored using a token swapping algorithm.

5. The method according to claim 1, wherein the size of said sequence is between 3 and 5.

6. The method according to claim 1, wherein said shortest paths are determined by precalculating the shortest paths between all the vertices of said graph.

7. The method according to claim 6, wherein said shortest paths are calculated by Dijsktra's algorithm.

8. A non-transitory computer-readable medium on which is stored a computer program comprising instructions which, when executed by a processor of a computer system, result in implementing a method according to claim 1.

9. Platform for optimizing a quantum circuit composed of an ordered series of quantum gates applied to an initial layout of qubit values, consisting of inserting a set of local SWAP gates so that all the gates of said quantum circuit are local, comprising digital processing means for inserting, for each quantum gate of said series if the gate is not local, a set of local SWAP gates before said quantum gate, determining the set of permutations, each consisting of a succession of swaps of qubit values along the shortest paths between the qubit positions associated with said quantum gate, and choosing, from said set of permutations, a permutation minimizing a cost representing the number of swaps required to make local the quantum gates of a sequence within said series, the size of said sequence being substantially smaller than that of said series;

restoring said initial layout by establishing a spanning tree of a graph representative of the layout of qubits of said circuit, and by swapping qubit values along paths of said tree.

10. The method according to claim 2, wherein said cost takes into account a cost attached to each type of SWAP gate to be inserted.

11. The method according to claim 2, wherein the initial layout is restored using a token swapping algorithm.

12. The method according to claim 3, wherein the initial layout is restored using a token swapping algorithm.

13. The method according to claim 2, wherein the size of said sequence is between 3 and 5.

14. The method according to claim 3, wherein the size of said sequence is between 3 and 5.

15. The method according to claim 4, wherein the size of said sequence is between 3 and 5.

16. The method according to claim 2, wherein said shortest paths are determined by precalculating the shortest paths between all the vertices of said graph.

17. The method according to claim 3, wherein said shortest paths are determined by precalculating the shortest paths between all the vertices of said graph.

18. The method according to claim 4, wherein said shortest paths are determined by precalculating the shortest paths between all the vertices of said graph.

19. The method according to claim 5, wherein said shortest paths are determined by precalculating the shortest paths between all the vertices of said graph.

20. A non-transitory computer-readable medium on which is stored a computer program comprising instructions which, when executed by a processor of a computer system, result in implementing a method according to claim 2.

\* \* \* \* \*